United States Patent [19]

Daignault et al.

[11] 4,332,687

[45] Jun. 1, 1982

[54] REMOVAL OF COMPLEXED HEAVY METALS FROM WASTE EFFLUENTS

[75] Inventors: Louis G. Daignault; Edward E. Schiller, both of Charlotte, N.C.

[73] Assignee: PCA International, Inc., Matthews, N.C.

[21] Appl. No.: 944,556

[22] Filed: Sep. 21, 1978

[51] Int. Cl.³ .............................................. C02F 1/78
[52] U.S. Cl. ................................... 210/721; 210/724; 210/758; 210/759; 75/109; 75/118 P
[58] Field of Search ...................... 210/50, 51, 52, 53, 210/63, 63 R, 63 Z, 199, 201, 202, 205, 206, 721, 722, 760, 723, 724, 726, 758, 759; 96/60 R, 60 BE; 423/561 R, 561 B, DIG. 14; 75/108, 109, 118 P

[56] References Cited

U.S. PATENT DOCUMENTS

| | | | |
|---|---|---|---|
| 1,870,404 | 8/1932 | Derr | 210/53 |
| 2,070,856 | 2/1937 | Butterfield | 210/63 R |
| 2,196,764 | 4/1940 | Folwell | 75/118 P |
| 3,285,849 | 11/1966 | Watanabe | 210/52 |
| 3,505,213 | 4/1970 | Anthony | 210/63 Z |
| 3,594,157 | 7/1971 | Hendrickson | 75/118 P |
| 3,716,485 | 2/1973 | Robertson | 210/50 |
| 3,767,572 | 10/1973 | Bober et al. | 210/50 |
| 3,804,755 | 4/1974 | Cervantes | 210/63 Z |
| 3,843,516 | 10/1974 | Yamada | 210/50 |
| 3,856,673 | 12/1974 | De La Mater et al. | 210/63 Z |
| 3,920,550 | 11/1975 | Farrell | 210/199 |

FOREIGN PATENT DOCUMENTS

| | | | |
|---|---|---|---|
| 50-26762 | 6/1975 | Japan | 210/63 R |
| 51-10176 | 1/1976 | Japan | 210/51 |
| 51-11662 | 6/1976 | Japan | 210/63 Z |
| 592761 | 1/1976 | U.S.S.R. | 210/63 Z |

OTHER PUBLICATIONS

"Ozonation of Photographic Processing Wastes", by Bober and Dragon, JWPCF, Aug. 1975, pp. 2114-2129.
"Removal of Heavy Metals via Ozonation", Shambaugh JWPCF, Jan. 1978, pp. 113-121.

Primary Examiner—Ernest G. Therkorn
Attorney, Agent, or Firm—Bell, Seltzer, Park & Gibson

[57] ABSTRACT

A waste solution containing heavy metals tightly bound by complexing agents such as EDTA, NTA, and thiosulfate is treated by contacting the solution with a mixture of peroxide and ozone to oxidize and destroy the complexing agents thereby facilitating separation and recovery of the heavy metals and reducing pollution of streams by the heavy metals.

12 Claims, 2 Drawing Figures

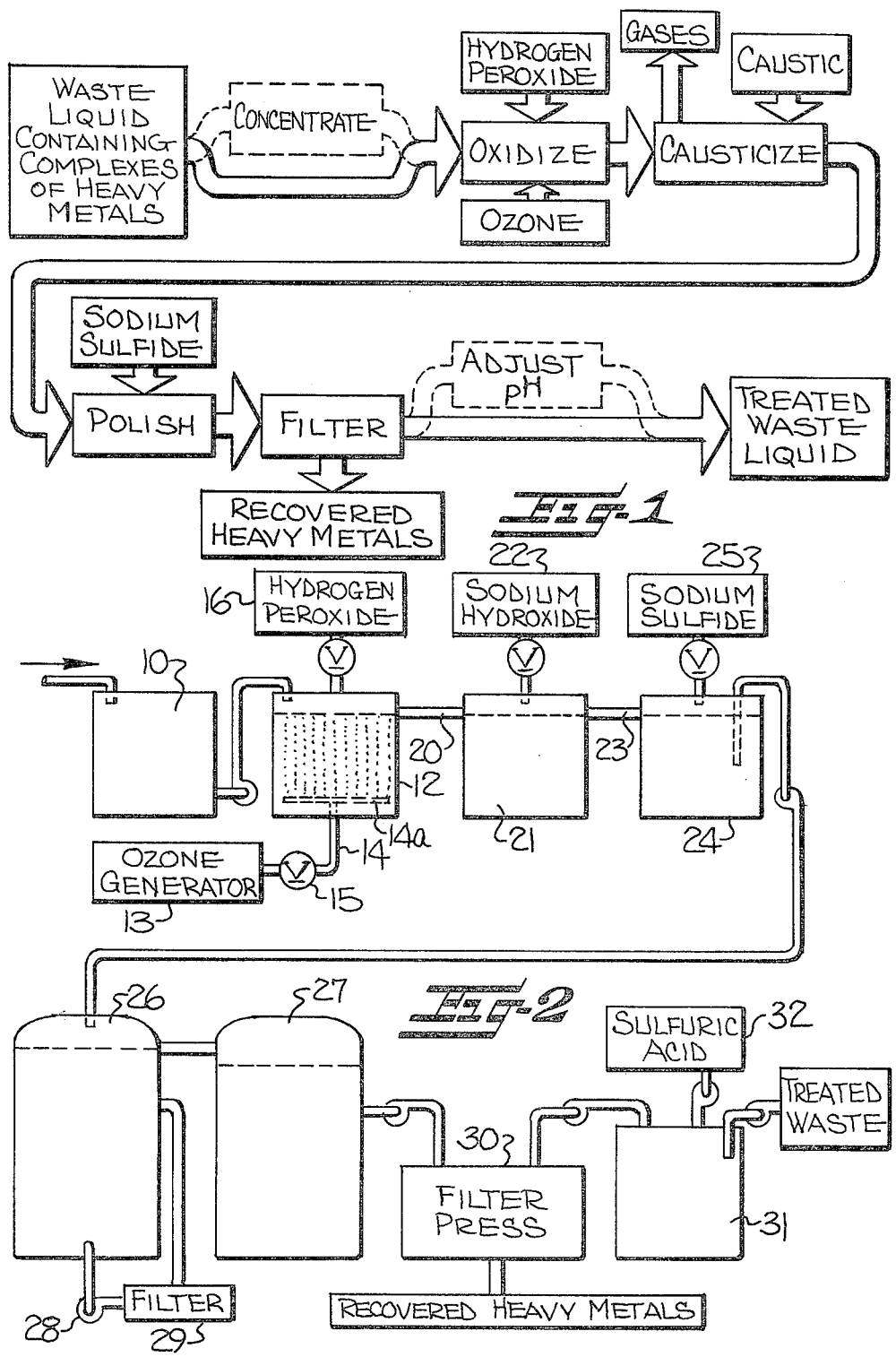

REMOVAL OF COMPLEXED HEAVY METALS FROM WASTE EFFLUENTS

FIELD OF THE INVENTION

This invention relates to waste treatment, and more particularly to the treatment of a waste solution containing complexes of heavy metals.

BACKGROUND OF THE INVENTION

There are a number of commercially available systems for the removal of heavy metals from waste water streams. These systems are widely used in the plating industry and work fairly well where the heavy metal is present as free ions, as is usually the case in the waste from plating operations. Where complexes of heavy metals are involved however, as found in photographic processing waste effluents for example, the conventional metal removal systems are substantially ineffective.

In photographic processing waste, the heavy metal ions are tightly bound by complexing agents such as ethylenediaminetetraacetate (EDTA), nitrilotriacetic acid (NTA), and thiosulfate. These very strong complexing agents must be broken before the metallic ions can be removed from the waste solution.

Among the approaches shown in the prior art for the treatment of photographic processing waste containing heavy metal complexes, Bober et al U.S. Pat. No. 3,767,572 discloses a method wherein waste photographic processing solutions containing EDTA complexes are treated by chlorination of the waste solution under alkaline conditions to destroy the EDTA.

It has also been proposed to employ ozone in the treatment of photographic processing wastes. An article in the August, 1975 issue of *Journal of Water Pollution Control Federation* entitled "Ozonation of Photographic Processing Wastes" explores the usefulness of ozone in treating various kinds of photograhic processing wastes, including heavy metal complexes.

However, the waste treatment methods which are presently known have been found to be ineffective, or at best, of limited usefulness for the treatment of waste photographic processing waste in large quantities on a commercial scale.

For example, investigations conducted by applicants in work leading up to the present invention indicated that while ozone had the ability to oxidize and destroy the complexing agents found in photographic processing waste, the quantity of ozone and time of treatment required to achieve effective results were very high, thus rendering the use of ozone uneconomical and unfeasable for treating photographic processing waste on a commercial scale.

With the foregoing in mind, it is a primary object of this invention to provide a practical and efficient method and apparatus for treating a waste solution containing complexes of heavy metals to facilitate separation and recovery of the heavy metals and to reduce pollution of streams by the heavy metals.

A more specific object of this invention is to provide a treatment method and apparatus which may be economically applied to the commercial scale treatment of photographic processing wastes containing complexes of heavy metals such as silver, iron, cadmium and lead to permit recovery of the valuable metal content and to reduce pollution of streams from the heavy metals.

SUMMARY OF THE INVENTION

In accordance with this invention, it has been determined that a waste solution containing complexes of heavy metals may be effectively and economically treated by contacting the waste solution with a mixture of peroxide and ozone. This treatment oxidizes and destroys the complexing agents and converts the heavy metals into a readily separable form.

More particularly, it has been determined that the use of relatively small amounts of peroxide, in combination with ozone treatment, achieves a very effective destruction of the complexing agents. The combined use of peroxide with ozone is so effective in destroying the complexing agents as to permit using small, economically practical amounts of peroxide and ozone and a relatively short time of treatment. Tests have surprisingly shown that the effectiveness of peroxide and ozone when used in combination is considerably greater than the effectiveness of either of these materials when used alone, and there thus appears to be a synergistic interaction between the peroxide and ozone when used in combination.

In carrying out the method of this invention, a waste solution containing heavy metals tightly bound by complexing agents is directed into a suitable reaction vessel and contacted with a mixture of peroxide and ozone. Preferably, this is accomplished by introducing the peroxide into the vessel and mixing with the waste solution while also bubbling ozone through the waste solution. The ozone and peroxide oxidize and destroy the complexing agents, leaving the heavy metals in a readily separable form.

The amount of ozone bubbled through the waste solution is preferably regulated so as not to exceed the amount which can be absorbed in the waste solution. For most effective results, ozone is desirably provided at concentrations approaching the maximum amount which is soluble in the waste solution. This maximum amount varies depending upon conditions, but may be readily ascertained by increasing the rate of ozone until evolution of ozone gas is observed, and then reducing the rate slightly until ozone evolution ceases.

For reasons of economy, the amount of peroxide used is preferably kept to a minimum. Preferably the peroxide is used in an effective amount up to about five percent by volume. Highly effective results have been observed using a peroxide concentration as low as $\frac{1}{2}$ to 1 percent by volume. Concentrations larger than this can be suitably employed if desired, however.

Because of the ready availability, cost, and ease of handling, hydrogen peroxide is the preferred peroxide for use in this invention. However, other peroxy compounds exhibiting strong oxidizing properties, such as sodium peroxide for example, are contemplated as being within the broad scope of this invention.

Following the destruction of the complexing agents by the ozone and peroxide, the heavy metals may be removed from the solution by precipitation and separation. Precipitation of the heavy metals may be accomplished by raising the pH of the solution to a relatively high value of about 12 or greater by addition of a suitable caustic material such as sodium hydroxide. In this highly alkaline solution, many of the heavy metals will precipitate as insoluble hydroxides or oxides.

Precipitation of additional heavy metals may then be brought about by treatment of the alkaline solution with a sulfide, such as sodium sulfide, to form insoluble heavy metal sulfides. To remove additional amounts of certain heavy metals, such as lead, which may be slightly soluble under highly alkaline conditions, small amounts of a soluble phosphate such as trisodium phosphate may be added to the solution. The precipitated heavy metals may then be separated from the supernatant liquid by a suitable separation process such as filtration.

The treatment process of this invention has been determined to be highly effective in removing complexes of heavy metals such as silver, iron, lead and cadmium which are commonly found in photographic processing wastes. The efficiency of this method is such that the value of the metals recovered by this process may significantly exceed the cost of treatment, thus making the practice of this process highly desirable from an economic standpoint, as well as from an ecological standpoint.

Tests have also demonstrated that the treatment process of this invention is very effective in removing heavy metals other than those noted above, such as aluminum, calcium, chromium, copper and magnesium for example. While these heavy metals are not generally found in substantial amounts in photographic processing wastes, they are often encountered in effluent streams from various industrial processes. Thus, it will be apparent that the present invention may be used in various applications outside of the photographic processing field where removal of heavy metals, especially complexed heavy metals, is necessary.

An additional feature of this invention is the reduction of TKN (Total Kjeldahl Nitrogen). Tests have demonstrated that plant waste treated by the process and apparatus of this invention shows a reduction in TKN of about 60-70 percent.

BRIEF DESCRIPTION OF THE DRAWINGS

Some of the objects, features, and advantages having been stated, others will become apparent as the description of this invention proceeds, when taken in connection with the accompanying drawings, in which—

FIG. 1 is a block diagram illustrating the treatment process of this invention; and FIG. 2 is a schematic illustration of an apparatus suitable for continuously carrying out the treatment process of this invention.

DETAILED DESCRIPTION OF ILLUSTRATIVE EMBODIMENT

For purposes of illustration, the treatment process of this invention will be described in detail as applied to the treatment of photographic processing waste containing complexes of heavy metals such as silver, cadmium, lead, and iron. This process may be carried out either batchwise or continuously. The drawings and the following detailed description are directed to a continuous process, but it should be readily apparent from this description how the invention would be practiced on a batchwise basis.

Referring to FIG. 2, incoming photographic processing waste solution containing heavy metals tightly bound by complexing agents such as ethylenediaminetetraacetate (EDTA), nitrilotriacetic acid (NTA), and thiosulfate is received from the photographic processing operation and collected in a surge tank 10. Optionally, depending upon the concentration of the heavy metals in the waste solution and other factors, the waste solution may be concentrated prior to being directed to the surge tank 10. Reverse osmosis or other suitable methods may be employed for this purpose.

The waste solution is directed by a pump 11 from the surge tank 10 and to a suitable reaction vessel or oxidizing tank, indicated at 12. Ozone from an ozone generator 13 is directed by a conduit 14 into the lower portion of the oxidizing tank where it is dispersed from a suitable diffuser 14a and allowed to bubble upwardly through the waste solution. The ozone produced by the ozone generator 13 is mixed with air and at a relatively low concentration of about one percent by volume. Suitable means such as a valve 15 is provided to permit controlling the rate of ozone flow into the tank. Preferably, the rate of discharge of ozone into the oxidizing tank 12 is controlled so as not to exceed the amount which can be absorbed in the waste solution, thereby avoiding wasteful and undesirable release of ozone in the vicinity of the treatment apparatus.

Hydrogen peroxide is metered into the oxidizing tank 12 from a suitable supply tank 16 and mixes with the waste solution in the tank. The concentration of hydrogen peroxide used may be very small, e.g. less than about five percent by volume, and effective results have been observed at significantly lower concentrations, e.g. on the order of about one-half to two percent by volume.

The volume of the oxidizing tank 12 and the flow rate of solution therethrough is preferably such as to provide a minimum residence time of about 4 hours in the oxidizing tank.

From the oxidizing tank the waste solution flows, via overflow pipe 20, to a causticizing tank 21. Here sodium hydroxide or other suitable caustic is directed from a supply source 22 into the causticizing tank at such a rate as to increase the pH of the solution to at least about 12, an preferably within the range of 12.5 to 13. Under these highly alkaline conditions certain of the heavy metals precipitate as insoluble hydroxides or oxides.

From batchwise tests it was observed that as the sodium hydroxide is added, a very strong reaction takes place, with evolution of gas as the waste solution goes from an acid to a basic system. As the pH reaches about 12.4 a second gas evolution takes place, this gas being ammonia. Along with the formation of ammonia, the heavy metals begin to precipitate as metal hydroxides and oxides.

The alkaline solution flows from the causticizing tank 21 through pipe 23 and to a polishing tank 24 where a sulfide such as sodium sulfide and optionally also a phosphate, such as trisodium phosphate, is added from a supply source 25 to bring about further precipitation of the heavy metals as insoluble heavy metal sulfides and/or phosphates.

The sulfide treatment is a time delayed process, and it was determined that a period of at least about one-half hour is required for the metal sulfide precipitate to form. It was also observed that if the final treated sample was allowed to set for about 24 hours, all of the metal precipitates would settle out, leaving a supernatant liquid that was virtually free of metal ions. Thus, in the illustrated apparatus the waste solution is directed from the polishing tank 24 to a pair of large capacity holding tanks 26, 27 connected in series. These tanks result in a residence time of about 24 hours allowing the metal laden precipitates to settle to the bottom. The settled precipitates may be periodically removed manually from the bottom of the holding tanks, or if desired a suitable slurry pump 28 and filtration apparatus 29 may be employed to withdraw the metal precipitate slurry from the bottom of the tanks, filter and remove the precipitates, and return the liquid to the tanks.

The supernatant liquid from the second holding tank is then directed through a filter press 30 to remove any final traces of precipitate. From the filter press, the supernatent liquid goes to a pH adjustment tank 31 where the pH is adjusted down to about 8 to 9 before discharge. As illustrated, this is accomplished by directing sulfuric acid or other suitable strong acid from a storage tank 32 into the pH adjustment tank 31.

The invention will be further understood from the following examples, which are provided merely by way of illustration and are not intended to limit the scope of the invention in any way nor the manner in which the invention may be practiced. Examples 3 to 6 illustrate methods in accordance with the invention, while comparative examples 1 and 2 set forth methods not in accordance with the invention and are provided to more clearly illustrate the advantageous results acheived in accordance with the invention.

COMPARATIVE EXAMPLE 1

To determine the effectiveness of ozone in oxidizing complexing agents, an airstream containing one percent ozone was passed through about four gallons of a concentrated waste photographic processing solution. After ten hours of treatment, the only significant change observed was a decrease in the pH of the solution from about 7.6 to 7.1. Very little change was observed in the appearance of the solution.

COMPARATIVE EXAMPLE 2

To determine the general effectiveness of hydrogen peroxide on the destruction of complexing agents, 70% concentrated hydrogen peroxide was added to a concentrated waste photographic processing solution at varying amounts up to about 20 percent by volume. Less than about 10 percent by volume peroxide had no apparent effect on the appearance or pH of the waste solution. Only when the peroxide was increased to about 10–20 percent by volume was there any noticeable effect on the waste solution. At this peroxide level the pH of the waste solution dropped from about 7.5 to 4.5 with evolution of a gas and some formation of precipitate. Upon adjusting the pH to 12.5, additional precipitation occurred.

As shown in Table 1, this test indicates that peroxide, when used in fairly large volumes on the order of 10 to 20 percent, followed by pH adjustment, was fairly effective in the removal of silver and iron, considerably less effective in the removal of lead, and almost totally ineffective in removing cadmium.

TABLE 1

| Sample | pH | Metal Concentration (ppm) | | | |
|---|---|---|---|---|---|
| | | Ag | Cd | Fe | Pb |
| 1. Untreated waste | 7.5 | 349 | 3.24 | 475 | 3.75 |
| 2. Sample 1 + $H_2O_2$ (10-20% by vol.) | 4.5 | 50 | 3.8* | 350 | 5.0* |
| 3. Sample 2 + NaOH | 12.5 | 5.6 | 3.0 | 5.0 | 2.5 |
| Percent removal | | 98 | 7.4 | 99 | 33 |

*The apparent increase is attributable to instrumentation error.

EXAMPLE 3

A small sample (approximately 4 liters) of photographic processing waste having an original concentration of heavy metals as indicated in Table 2 was treated with a small amount (5–10% by volume) of 70 percent concentration hydrogen peroxide and the pH adjusted to 9.5 with sodium hydroxide. As shown in Table 2, this treatment resulted in a fairly good removal of silver (90.6%). Iron, cadmium and lead, however, were still not removed to any significant extent. Treatment of this solution with a stream of one percent ozone in air and further pH adjustment to 13 resulted in a significant improvement in the removal of all metals, especially iron and lead. The addition of a small amount of sodium sulfide resulted in an excellent removal of all metals. This test demonstrates that the combined peroxide and ozone treatment is considerably more effective in breaking the metal complex than treatment with peroxide alone, and that sulfide treatment is highly effective as a final step in precipitating the heavy metals.

TABLE 2

| Sample | pH | Metal Concentration (ppm) | | | |
|---|---|---|---|---|---|
| | | Ag | Cd | Fe | Pb |
| 1. Concentrate | 7.5 | 444 | 3.6 | 611 | 3.33 |
| 2. Sample 1 + $H_2O_2$ + NaOH | 9.5 | 41.7 | 3.3 | 240 | 3.11 |
| 3. Sample 2 + Ozone | 9.7 | 27.8 | 3.3 | 222 | 2.88 |
| 4. Sample 3 + NaOH | 13.0 | 26.3 | 3.14 | 20.7 | 2.44 |
| 5. Sample 4 + $Na_2S$ | 13.0 | 0.3 | 0.07 | 0.73 | 0.0 |
| Percent removal by treatment 2 | | 90.6 | 8.3 | 60.7 | 6.6 |
| Percent removal by treatment 4 | | 94 | 12.8 | 96.6 | 26.7 |
| Percent removal by treatment 5 | | 99.9 | 98 | 99.9 | 100 |

EXAMPLE 4

In order to determine whether the cost of treatment chemicals could be reduced to an economically acceptable level for use in a full plant system, tests were carried out to see if a combination of ozone and a reduced amount of 70 percent concentrated hydrogen peroxide in the order of 1 percent by volume would be effective in the destruction of the complexing agents. The results shown in Table 3 show that a concentration of 1 percent peroxide with ozone, followed by pH adjustment and sodium sulfide treatment, is very effective in the removal of the metals, especially lead.

TABLE 3

| Sample | pH | Metal Concentration (ppm) | | | |
|---|---|---|---|---|---|
| | | Ag | Cd | Fe | Pb |
| 1. Concentrate | 7.5 | 547.6 | 4.99 | 591 | 6.12 |
| 2. Sample 1 + $O_3$ + $H_2O$ + NaOH | 12.7 | 59.5 | 2.92 | 3.18 | 1.02 |
| 3. Sample 2 + 3 g/l $Na_2S$ | 12.7 | 0.33 | 0.09 | 9.99 | 0.0 |
| 4. Sample 3 + $H_2SO_4$ | 7.0 | 0.19 | 0.07 | 14.99 | 0.0 |
| 5. Sample 4 + 1.5 g/l $Na_2S$ | 7.0 | 1.07 | 0.23 | 8.18 | 0.0 |
| Percent removal by treatment 2 | | 89 | 41.5 | 99.4 | 83.3 |
| Percent removal by treatment 3 | | 99.9 | 98.1 | 98.3 | 100 |
| Percent removal by treatment 5 | | 99.8% | 95.4 | 98.6% | 100% |

EXAMPLE 5

To determine the applicability of the treatment process to a continuous flow system, tests were conducted in a small pilot plant flow system which contained 2–20 liter reaction tanks. The first tank was used as an oxidation vessel in which to the waste concentrate was treated with ozone and hydrogen peroxide. The second tank was used to continuously adjust the pH to 13. At various times samples were removed and 3 g/l sodium sulfide added. After a period of at least one-half hour, the sample was filtered and the filtrate tested for metal content.

The results of three of the pilot plant runs are shown in Table 4. These results indicate that the flow system was about as effective in the removal of the metals as were the smaller batch experiments of Examples 3 and 4.

EXAMPLE 6

Based on the results of the pilot plant tests, a full scale plant metal removal system was designed to handle a flow of 4 gpm of waste. A schematic diagram of the system is shown in FIG. 2, and a general description of the system is given earlier.

Table 5 shows the overall results of the metal removal system. Since there is an overall residence time of about 24 hours, the efficiency of the system must be determined by looking at samples that were taken 24 hours apart, and for this reason, the test results in Table 5 are presented in pairs, labeled "Before" and "After 24 Hours".

TABLE 4

| | Metal Concentration (ppm) | | | |
|---|---|---|---|---|
| | Ag | Cd | Fe | Pb |
| Run #1 | | | | |
| 1. Original | 491.5 | 4.08 | 523.8 | 2.64 |
| 2. Treated | 0.21 | 0.12 | 2.97 | 0.58 |
| Percent removal | 99.9 | 97.1 | 99.4 | 78.0 |
| Run #2 | | | | |
| 1. Original | 57.1 | 3.25 | 212.5 | 2.2 |
| 2. Treated | 0.83 | 0.11 | 10.5 | 0.3 |
| Percent removal | 98.5 | 96.6 | 95.1 | 86.4 |
| Time Study On Flow System | | | | |
| Run #3 | | | | |
| 1. Original (1100 hrs) | 514 | 6.05 | 480 | 2.56 |
| 2. Treated at (1300 hrs) | 3.6 | 0.2 | 25.5 | 0.4 |
| 3. Treated at (1500 hrs) | 1.09 | 0.08 | 24.0 | 0.07 |
| 4. Treated at (1630 hrs) | 4.81 | 0.26 | 127.1 | 0.10 |
| 5. Treated at (1830 hrs) | 5.71 | 0.26 | 117.9 | 0.20 |
| 6. Treated at (2030 hrs) | 8.82 | 0.40 | 132 | 0.09 |
| 7. Treated at (2230 hrs) | 6.03 | 0.35 | 116.4 | 0.20 |

TABLE 5

| | Metal Concentration (ppm) | | | |
|---|---|---|---|---|
| Random Samples | Ag | Cd | Fe | Pb |
| Before | 363 | 8.3 | 476 | 2.6 |
| After 24 Hrs | 40.7 | 2.1 | 34.3 | 1.39 |
| Before | 491.9 | 6.95 | 695.6 | 3.14 |
| After 24 Hrs | 13.8 | 0.27 | 40.9 | 1.09 |
| Before | 300 | 4.3 | 213 | 1.75 |
| After 24 Hrs | 0.24 | 0.16 | 4.44 | 1.38 |
| Before | 367 | 4.9 | 481 | 3.29 |
| After 24 Hrs | 1.5 | 0.19 | 7.0 | 0.75 |
| Before | 484.5 | 4.10 | 629.2 | 2.76 |
| After 24 Hrs | 18.9 | 0.31 | 17.1 | 0.63 |
| Before | 358.6 | 3.33 | 397.8 | 2.0 |
| After 24 Hrs | 0.27 | 0.07 | 11.8 | 0.21 |
| Before | 339.2 | 4.25 | 516.1 | 2.56 |
| After 24 Hrs | 0.31 | 0.087 | 8.13 | 0.50 |
| Before | 304.3 | 4.15 | 517.2 | 1.81 |

TABLE 5-continued

| | Metal Concentration (ppm) | | | |
|---|---|---|---|---|
| Random Samples | Ag | Cd | Fe | Pb |
| After 24 Hrs | 0.98 | 0.16 | 6.13 | 0.66 |

In the drawings and specification, there has been set forth a preferred embodiment of the invention, and although specific terms are employed, they are used in a generic and descriptive sense only and not for purposes of limitation.

That which is claimed is:

1. A method of treating a waste solution containing heavy metals tightly bound by one or more complexing agents selected from the group consisting of EDTA, NTA and thiosulfate to facilitate separation and recovery of the heavy metals and to reduce pollution of streams by the heavy metals, said method comprising contacting the waste solution with a synergistic mixture of peroxide and ozone to oxidize and destroy the complexing agents and convert the heavy metals into a readily separable form.

2. A method according to claim 1 wherein the step of contacting the waste solution with a mixture of peroxide and ozone comprises mixing peroxide with the waste solution while also bubbling ozone through the waste solution.

3. A method according to claim 2 wherein the ozone is bubbled through the waste solution in an amount not substantially exceeding that which can be absorbed in the mixture.

4. A method according to claim 2 wherein the peroxide comprises hydrogen peroxide, and the peroxide is mixed with the waste solution in an effective amount up to about five percent by volume.

5. A method of treating a waste solution containing heavy metals tightly bound by one or more complexing agents selected from the group consisting of EDTA, NTA and thiosulfate to separate and recover the heavy metals and reduce pollution of streams by the heavy metals, said method comprising contacting the waste solution with a synergistic mixture of peroxide and ozone to oxidize and destroy the complexing agents, precipitating the heavy metals from the thus treated solution, and separating the insoluble heavy metal precipitates from waste solution to permit recovery of the valuable metal content thereof and to leave the waste solution substantially free of the heavy metals.

6. A method according to claim 5 wherein the step of precipitating the heavy metals from the solution comprises raising the pH of the solution to at least about 12 to precipitate insoluble oxides and hydroxides of the heavy metals, and thereafter contacting the alkaline solution with a sulfide to further precipitate the heavy metals.

7. A method according to claim 6 wherein the step of precipitating the heavy metals from the solution also includes contacting the alkaline solution with a phosphate to additionally precipitate the heavy metals as insoluble heavy metal phosphates.

8. A method according to claim 5 including the additional steps of lowering the pH of the waste solution after separating the insoluble precipitates, and discharging the thus treated waste solution substantially free of the heavy metals.

9. A method according to claim 5 wherein the waste solution comprises concentrated photographic processing wastes containing heavy metals tightly bound by one or more of said complexing agents.

10. A method according to claim 5 wherein the step of contacting the waste solution with a mixture of peroxide and ozone comprises mixing hydrogen peroxide with the waste solution in an effective amount up to about five percent by volume while also bubbling ozone through the mixture of waste solution and hydrogen peroxide in an amount not substantially exceeding that which can be absorbed in the mixture.

11. A continuous method for the treatment of waste solutions which contain heavy metals tightly bound by one or more complexing agents selected from the group consisting of EDTA, NTA and thiosulfate to recover the heavy metals and reduce pollution of streams by the heavy metals, said method comprising directing the waste solution containing the heavy metal complexes into a reaction vessel and introducing hydrogen peroxide into the reaction vessel and into contact with the waste solution while also bubbling ozone through the waste solution to oxidize and destroy the complexing agents and convert the heavy metals into a readily separable form, directing the solution from the reaction vessel to a causticizing vessel and introducing a causticizing agent to raise the pH of the solution to at least about 12 and precipitate some of the heavy metals as insoluble heavy metal oxides and hydroxides, directing the solution from the causticizing vessel to a polishing vessel and introducing sodium sulfide into the solution to bring about additional precipitation of the heavy metals as heavy metal sulfides, directing the solution and insoluble precipitates from the polishing vessel and separating the insoluble heavy metal precipitates from the waste solution leaving the solution substantially free from the heavy metals.

12. A method according to claim 11 wherein the solution and precipitate is directed from the polishing vessel to a holding vessel, and including the step of holding the solution for at least about 24 hours prior to separation of the precipitate therefrom to allow time for complete precipitation of the insoluble heavy metals.

* * * * *